Jan. 18, 1944. W. E. EDWARDS 2,339,386
RECOVERY OF ORGANIC LIQUIDS WHICH ARE SOLUBLE
OR PARTIALLY SOLUBLE IN WATER
Filed June 23, 1941 3 Sheets-Sheet 3

Inventor
W. E. Edwards
by
W. E. Evans
Attorney.

Patented Jan. 18, 1944

UNITED STATES PATENT OFFICE 2,339,386

RECOVERY OF ORGANIC LIQUIDS WHICH ARE SOLUBLE OR PARTIALLY SOLUBLE IN WATER

William Ernest Edwards, Leigh, England, assignor to Sutcliffe, Speakman and Company Limited, Leigh, England Application June 23, 1941, Serial No. 399,426
In Great Britain September 7, 1939

3 Claims. (Cl. 210—122.5)

The invention relates to the recovery from aqueous solution of organic liquids such as ethyl acetate.

In the recovery of organic liquids such as an organic solvent from air laden with the solvent it is usual to pass the solvent laden air through a sorptive medium such as activated carbon from which the solvent is recovered on its being flushed with steam in known manner. Where however the organic solvent is wholly or partly soluble in water a considerable part becomes admixed with the aqueous condensate and it is necessary to recover that part by redistillation and the use of a special plant for the purpose.

The invention has among its objects to avoid this disadvantage.

According to the invention organic liquids in aqueous solution are passed downwardly through a sorptive medium such as activated carbon in the charging phase, and steam then passed in the flushing phase upwardly into contact with the active carbon whereby the active carbon is heated to the temperature at which the organic liquid is vaporised, the steam condensed in heating the active carbon is drained away and the further steaming serves to drive the organic liquids out of the active carbon substantially free of water.

An apparatus for effecting the recovery of organic liquids by the method described may comprise a container for the sorptive medium, an inlet pipe for aqueous solution and an outlet pipe for the vapour of the organic liquid connected to the upper part of the container and an outlet pipe for the water freed of the organic liquid, an inlet pipe for steam and a trap device for condensed steam connected to the lower part of the container and valves or other means for controlling the charging and flushing operations in the container.

The invention is illustrated by way of example in the accompanying drawings in which.

Figure 1:
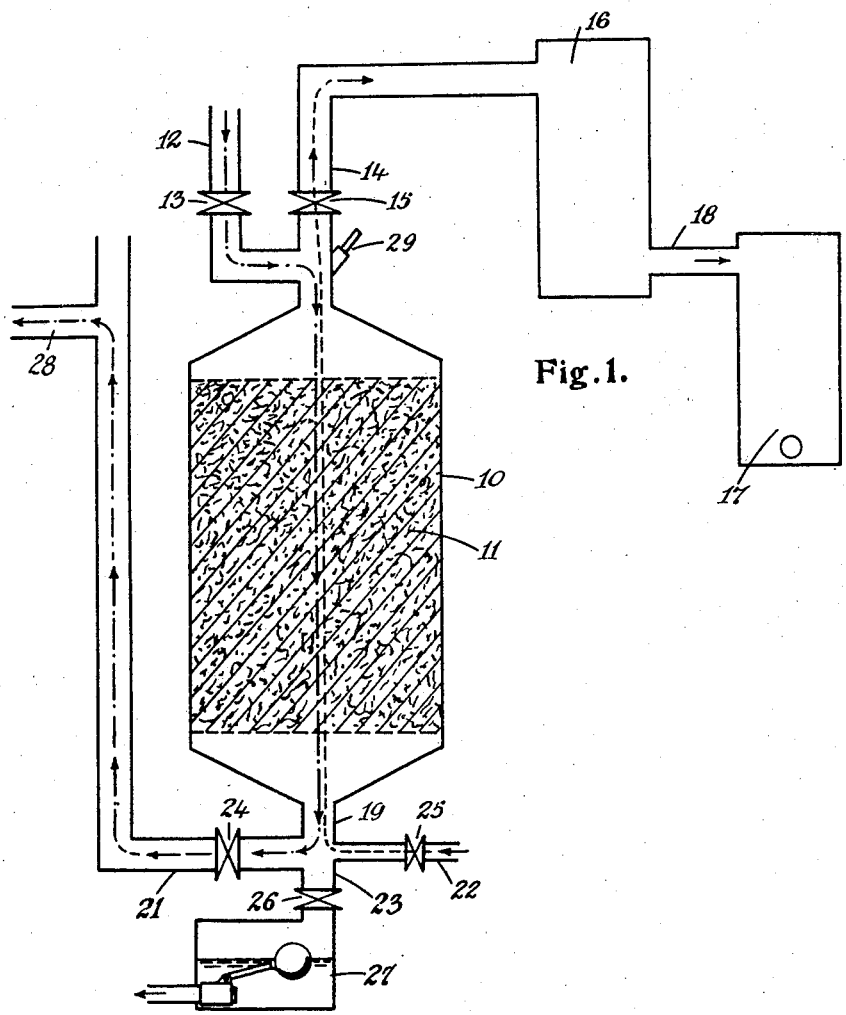
Figure 1 is a diagram of apparatus according to the invention.

In carrying the invention into effect in the recovery of a solvent such for example as ethyl acetate from an aqueous solution, the apparatus as diagrammatically illustrated in Figure 1 comprises a substantially cylindrical container 10 for the sorptive medium 11, which advantageously may be active carbon in the condition of grains. The container serves as an adsorption filter for the recovery of the solvent, and may be of any known construction such as commonly used for the recovery of solvents.

At the upper end the container has connected to it an inlet pipe 12 for the admission of the aqueous solution of the solvent under control by the valve 13. The inlet pipe 12 is connected to the lower end of a vapour outlet pipe 14 beneath the controlling valve 15, which is closed during the charging phase. The outlet pipe 14 serves in the flushing phase to convey the separated vapour to a condenser 16, the latter in turn communicating with a recevier or storage tank 17, into which the recovered condensate passes through the outlet pipe 18.

An outlet pipe 19 at the lower end of the container has three branches, 21, 22 and 23, which are controlled respectively by valves 24, 25 and 26. The branch 21 serves as the outlet for the water from which the solvent has been separated by adsorption in the charging phase, the branch 22 serves as an inlet pipe for the hot steam used in the steaming or flushing phase, while the branch 23 extends downwardly and is connected with a tank 27, the outlet from which may be float-controlled for the release of the condensed water recovered in the flushing phase. The branch 21 may advantageously extend upward and be provided in position above the container with an outlet 28 for the water freed from the solvent, thus ensuring that the container 10 is maintained full of the aqueous solution during the charging phase.

In operation the aqueous solution of the solvent is passed downwardly from the inlet pipe 12 through the sorptive medium 11 during the charging phase, whereby the solvent is adsorbed and the water freed of the solvent passes through the branch 21 and is discharged by way of the outlet 28 as indicated in dot and dash lines, the valves 25, 26 and 15 being closed.

When the sorptive medium 11 is nearing saturation point the valve 13 on the inlet pipe 12 and the valve 24 on the outlet branch 21 are closed and the valves 15 and 25 on the pipes 14 and 22 respectively are opened, for the admission into the container of hot steam for the flushing operation. The steam as indicated in dotted lines passes through the pipes 22 and 19 upwardly through the sorptive medium 11 charged with the solvent, thereby heating the medium to the temperature at which the solvent is vaporised, the solvent vapour passing upward, as indicated in dotted lines, through the outlet pipe 14 into the condenser 16, and the condensate passing from the condenser 16 through the pipe 18 to the receiver 17.

It will be understood that the steam passing upward through the sorptive medium in the flushing phase causes the heating of the sorptive medium and that the condensed steam, free of the solvent, drains downward into the tank 27 by way of the pipes 19 and 23. The sorptive medium is heated uniformly throughout and the solvent passes out to the condenser 16, and thence to the receiver 17, substantially free of water. The distillation is arrested at a determined temperature of the outcoming vapour as may be indicated by a thermometer 29 set in the outlet pipe 14.

Thus, the solvent is distilled from the sorptive medium in an upward direction, the wet carbon serving as a fractionator or dephlegmator by which practically pure vapour of the solvent passes through to the condenser while the aqueous condensate runs back through the sorptive medium to drain into the receiving tank.

Figure 2:
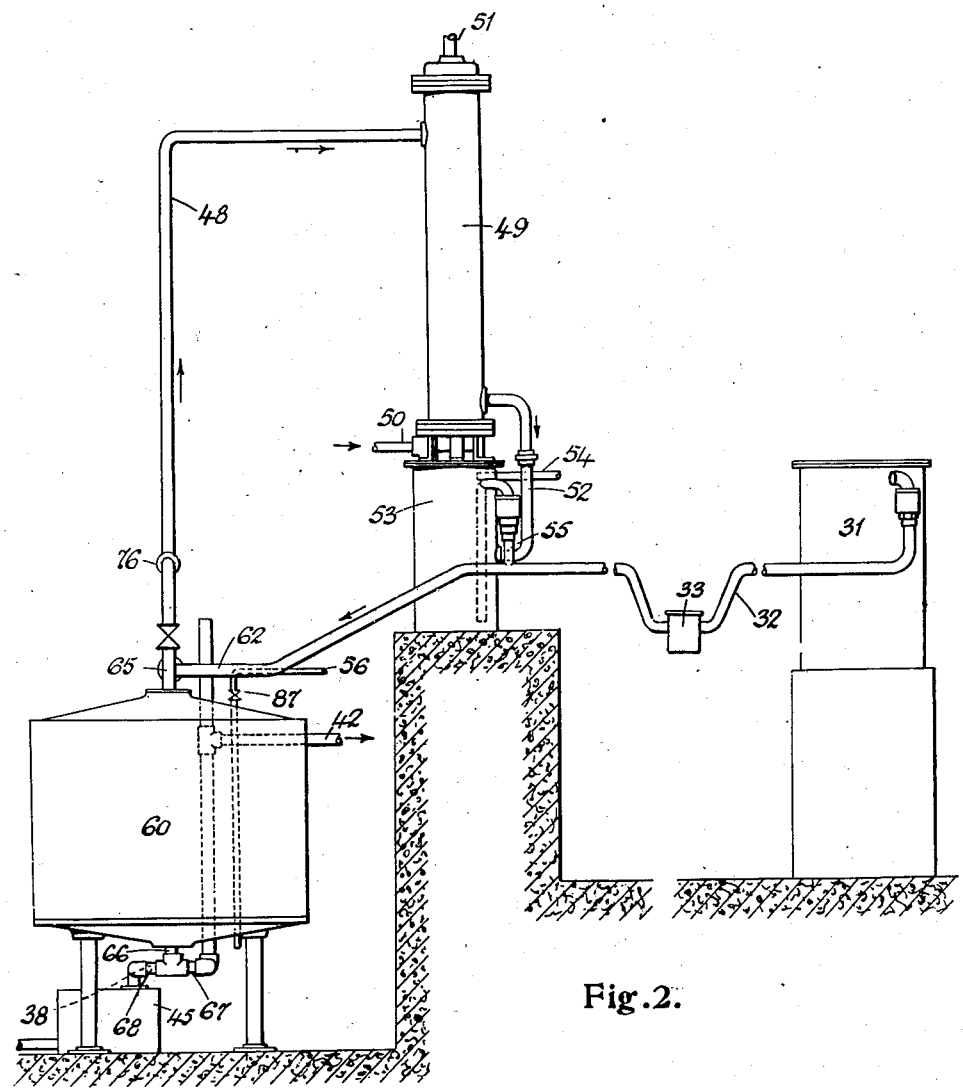
Figures 2, 3 and 4 are respectively end elevation, plan and front elevation of another apparatus constructed according to the invention, in which a pair of adsorption filters is employed operating on alternating phases.
Figure 3:
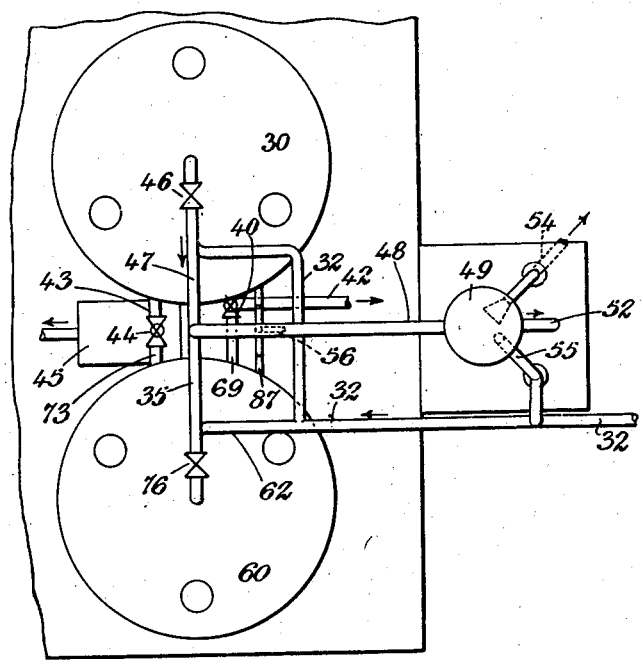
Figure 4:
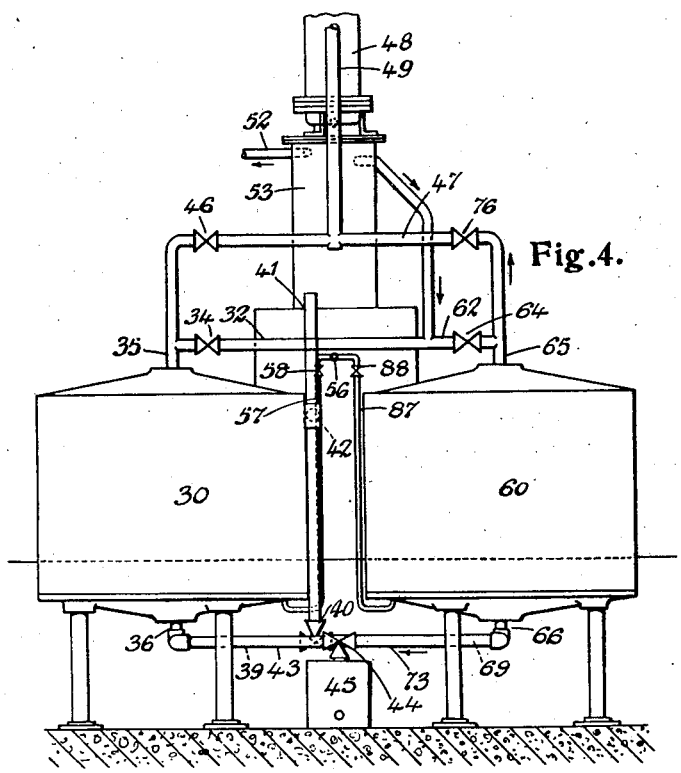

In carrying the invention into effect as illustrated in Figures 2 to 4 of the accompanying drawings two containers 30, 60, for the sorptive medium are employed for alternative use, one operating in the charging phase while the other is operating in the flushing phase. The aqueous condensate with small quantities of solvent resulting from the flushing of the solvent adsorber plant (not shown) is passed for preliminary separation to a separator 31. The inlet pipe 32 supplying the containers 30, 60, receives the aqueous solution from the separator 31, the flow of the solution being measured by a meter 33. Near the containers the pipe 32 is diverted to supply the container 30 while a branch 62 is provided to supply the container 60, the admission of the aqueous solution to the two containers being controlled respectively by the valves 34 and 64 and being effected by way of the respective vapour outlet pipes 35 and 65. The outlet pipes 36, 66 branch rearwardly at 37 and 67 and forwardly at 38 and 68 respectively. The branches 37 and 67 are respectively connected by pipes 39, 69 to a common two-way controlling valve 40 from which there extends upwardly a common vent pipe 41 from which the water outlet pipe 42 branches near the top of the containers. The branches 38 and 68 are similarly connected by pipes 43, 73 to a two-way controlling valve 44 having an outlet leading to the float tank 45. The vapour outlet pipes 35, 65 are controlled respectively by the valves 46 and 76 which are connected by a pipe 47 having a pipe 48 connecting it with the condenser 49 through which cooling water is passed from 50 to 51. The condensate passes by way of the pipe 52 into a receiver or separator 53 where separation is effected by gravity and whence the separated solvent free of water passes away by an overflow pipe 54 opening into the upper end of the receiver or separator 53 while the separated water is drawn from the bottom of the separator 53 by way of the downwardly depending pipe and the outlet fitting 55 for return to the inlet pipe 32.

The steam for the flushing phase is supplied independently of the outlet pipes 36, 66, by way of a supply pipe 56 branching into the pipes 57, 87 leading to the bottom of the containers 30, 60 respectively. The pipes 57, 87 are provided with controlling valves 58 and 88.

In the operation of the plant, when the container 30 is in the charging phase and the container 60 in the flushing phase, the valves 34, 76 and 87 are maintained open and the valves 64, 46 and 57 closed while the valve 40 is set to connect the pipe 39 to the vent pipe 41 and the valve 44 to connect the pipe 69, with the tank 45. When the containers are required to be changed over the setting of the several valves is, of course, reversed.

It is found in actual practice with respect to ethyl acetate that the aqueous solution of the solvent contains only from 3 to 5%. This in normal practice is either lost or requires distillation in which latter case the whole of the liquor has to be heated for reclaiming the ethyl acetate, whereas according to the invention the ethyl acetate is concentrated in the carbon that is to say to between 15% to 20% of the weight of the carbon. Thus, the method of the invention presents advantages of considerable practical importance. Furthermore, the amount of hot steam required in the flushing phase is very small and practically the whole of the solvent is recovered.

It will be understood that the distillation of the ethyl acetate from the carbon is complete when the temperature of the vapour issuing from the adsorptive filter begins suddenly to rise that is to say when the lower boiling solvent vapours have passed off and the steam alone commences to pass through.

In the construction illustrated in Figures 2 to 4 a separator 53 is provided under the condenser for the purpose of separating any aqueous condensate which comes away from the carbon when the ethyl acetate has been completely distilled off. The aqueous condensate is returned for passage through one of the containers during the charging phase, as hereinbefore described.

It will be understood that the invention is of general application for the recovery of vapours that are soluble or partially soluble in water such as low boiling hydrocarbons or other substances such as benzene and butyl acetate or amyl acetate, the temperature conditions in the flushing phase being determined according to the boiling point of the material.

By the process of the invention the organic liquids are recovered directly from the active carbon in a condition substantially free of water.

I claim:

1. A method of recovering organic liquids of low boiling point from aqueous solutions in which they are soluble, consisting in passing the aqueous solution downwardly through an adsorptive filter containing a sorptive medium serving for the recovery of the low boiling organic liquid from the solution, passing steam upwardly into contact with the sorptive medium to heat it to the temperature at which the adsorbed low boiling organic liquid is vaporised, draining away the steam condensed in heating the sorptive medium, continuing the steaming to drive from the heated sorptive medium the vaporised organic liquid substantially free of water and condensing the vapour to recover the organic liquid.

2. An apparatus for carrying out the method of claim 1, comprising a container for the sorptive medium, an inlet pipe for aqueous solution and an outlet pipe for the vapour of the organic liquid connected to the upper part of the container above the sorptive medium and an outlet pipe for the water freed of the organic liquid, an inlet pipe for steam and a trap device for condensed steam connected to the lower part of the container beneath the sorptive medium and means for controlling the charging and flushing operations in the container.

3. A method of recovering organic liquids of low boiling point from aqueous solutions in which they are soluble according to claim 1, consisting in continuing the steaming of the sorptive medium until the temperature of the discharge vapours at the vapour outlet of the container begins to rise, indicating the presence of steam.

WILLIAM ERNEST EDWARDS.